(12) United States Patent
Kuether et al.

(10) Patent No.: US 7,739,717 B1
(45) Date of Patent: Jun. 15, 2010

(54) SYSTEM AND METHOD FOR PERFORMING DIAGNOSTICS FOR A CUSTOMER IRD IN A SATELLITE TELEVISION SYSTEM

(75) Inventors: David J. Kuether, Brea, CA (US); Philip I. Siegel, Fountain Valley, CA (US); James D. Allen, Westlake Village, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1677 days.

(21) Appl. No.: 10/891,386

(22) Filed: Jul. 13, 2004

(51) Int. Cl.
*H04N 7/173* (2006.01)
(52) U.S. Cl. .................. 725/107; 725/68
(58) Field of Classification Search ............ 725/107, 725/63–69; 714/24–40; 342/350–465
See application file for complete search history.

(56) References Cited

U.S. PATENT DOCUMENTS

| | | | |
|---|---|---|---|
| 4,057,847 A | 11/1977 | Lowell et al. | |
| 4,677,467 A | 6/1987 | Hayes | |
| 4,760,597 A | 7/1988 | Hayes et al. | |
| 4,987,486 A | 1/1991 | Johnson et al. | |
| 5,093,921 A | 3/1992 | Bevin, Jr. | |
| 5,373,288 A | 12/1994 | Blahut | |
| 5,666,293 A | 9/1997 | Metz et al. | |
| 5,796,953 A | 8/1998 | Zey | |
| 5,936,667 A * | 8/1999 | Saib et al. | 348/180 |
| 5,954,808 A | 9/1999 | Paul | |
| 6,049,830 A | 4/2000 | Saib | |
| 6,081,533 A | 6/2000 | Laubach et al. | |
| 6,160,991 A | 12/2000 | Chappell et al. | |
| 6,285,396 B1 | 9/2001 | Har Shoshanim et al. | |
| 6,445,907 B1 * | 9/2002 | Middeke et al. | 455/226.1 |
| 6,598,229 B2 | 7/2003 | Smyth et al. | |
| 6,611,865 B1 | 8/2003 | Perugini et al. | |
| 6,662,367 B2 | 12/2003 | Dapper et al. | |
| 6,681,344 B1 * | 1/2004 | Andrew | 714/38 |
| 6,687,486 B2 | 2/2004 | Grzeczkowski | |
| 7,020,689 B2 * | 3/2006 | Simyon et al. | 709/206 |
| 2002/0184568 A1 * | 12/2002 | Kurrasch | 714/39 |
| 2003/0028891 A1 | 2/2003 | Hardt et al. | |
| 2003/0237035 A1 * | 12/2003 | Bowers et al. | 714/724 |

(Continued)

FOREIGN PATENT DOCUMENTS

WO    WO 94/13107    6/1994

(Continued)

*Primary Examiner*—Andrew Y Koenig
*Assistant Examiner*—Anthony Bantamoi (57) ABSTRACT

An IRD is provided with expanded self-test capabilities, both hardware and software, that will provide standardized and more precise diagnostics. The IRD runs a sequence of tests to determine the fitness of the IRD and the health of the ODU. As the tests are completed, the results are displayed on-screen and written to a report. If a test fails, the appropriate remedial action such as "reset to factory default settings", "service call" or "replace IRD, access card, modem, ODU" is also written to the report. The IRD appends the test report to a header message and forwards it to the service provider. The satellite service provider archives the report, modifies the header message to provide customer contact information and the responsible dealer, and forwards the file to the service dealer. To improve service and accountability, the dealer may send an acknowledgement back to the service provider and customer.

24 Claims, 12 Drawing Sheets

U.S. PATENT DOCUMENTS

| | | | |
|---|---|---|---|
| 2004/0014479 A1* | 1/2004 | Milman | 455/457 |
| 2004/0158863 A1 | 8/2004 | McLain | |
| 2004/0237116 A1* | 11/2004 | Allen | 725/121 |
| 2005/0183130 A1* | 8/2005 | Sadja et al. | 725/107 |
| 2009/0058397 A1* | 3/2009 | Fitzpatrick et al. | 324/72 |

FOREIGN PATENT DOCUMENTS

| | | |
|---|---|---|
| WO | WO 01/37568 A1 | 5/2001 |
| WO | WO 01/80528 A2 | 10/2001 |
| WO | WO 01/97039 A1 | 12/2001 |
| WO | WO 02/076100 A2 | 9/2002 |
| WO | WO 02/078345 A1 | 10/2002 |
| WO | WO 03/049445 A2 | 6/2003 |

* cited by examiner

OSD TABLE
OSD 1: REMOVE THE COAX CABLE FROM THE SATELLITE ANTENNA IN CONNECTOR
OSD 2: AN ERROR HAS BEEN DETECTED IN THE IRD, ERROR NO. XXX
OSD 3: A FAILURE HAS BEEN DETECTED IN THE IRD, FAILURE NO. XXX
OSD 4: TELEPHONE TEST COMPLETE, PLEASE HANG UP YOUR PHONE
OSD 5: AN ERROR HAS BEEN DETECTED WITH THE ACCESS CARD
OSD 6: TAKE YOUR TELEPHONE OFF THE HOOK AND LISTEN FOR A TONE. PRESS SELECT TO START
OSD 7: DID YOU HEAR A TONE DURING THE TEST?
OSD 8: TEST COMPLETE WITH X FAILURES DETECTED, X=NO, 1, 2, ETC.
OSD 9: SERVICE REQUEST RECEIVED BY DEALER ________, (A) SERVICE CALL
WILL BE SCHEDULED IN 3-5 BUSINESS DAYS (B) THE DEALER WILL MAIL
YOU A REPLACEMENT (IRD, ACCESS CARD, MODEM, ODU) IN 3-5 BUSINESS DAYS
OSD 10: VERIFY COAX CONNECTION
OSD 11: DELETE PROGRAMMING FROM THE HARD DRIVE

IRD DIAGNOSIS TEST DATA REPORT — 98
CUSTOMER ID: 123456
DATE: JANUARY 02, 2004
TIME: 11:02:03
LNB VOLTAGE EVEN: PASS
LNB VOLTAGE ODD: FAIL TEST 2, LNB 13V, UNDER LIMIT
LNB CURRENT EVEN: PASS
LNB CURRENT ODD: PASS
22KHZ FREQ: PASS
22KHZ AMP: PASS
TELCO TEST: PASS
ACCESS CARD TEST: PASS
ACCESS CARD ID: 0013 1234 5678
RECEIVER ID TEST: PASS
RECEIVER ID: 0001 5678
LOCK SETTING: LOCKED
RATING SETTING: PG
LIMIT SETTING: $5.00
HD TEST: PASS
HD SPACE LEFT: 12.6G
IRD ODOMETER: AUG 12, 2003
TIME SINCE ACTIVATION: 4MO, 10D, 6HR, 4MIN
ANT CONFIG: 1 SAT
TRANSPONDER LEVELS:
1: 85
2: 88
3: 92
4: 89
5: 91
6: 88
.
.
32: 92
SUMMARY: 1 TEST FAIL, 16 TEST PASS,
SCHEDULE SERVICE CALL OR REPLACE (IRD, ACCESS CARD, MODEM)

FIG.6

SATELLITE SERVICE PROVIDER MESSAGE 1
THE FOLLOWING CUSTOMER HAS NEED FOR SERVICE:
DATE REPORTED: JANUARY 02, 2004
CUSTOMER ID: 1234556
PROBLEM: FAIL TEST 2, LNB 13V, UNDER LIMIT

FIG.7a

DEALER MESSAGE 1
THE FOLLOWING CUSTOMER HAS NEED FOR SERVICE:
DATE REPORTED: JANUARY 02, 2004
CUSTOMER ID: 1234556
CUSTOMER NAME: BRIAN JONES
CUSTOMER PHONE NUMBER: (310) 555-1212
PROBLEM: FAIL TEST 2, LNB 13V, UNDER LIMIT
RESPONSIBLE DEALER: SATELLITE SERVICES INC., EL SEGUNDO CA., (310) 515-5555

FIG.7b

SATELLITE SERVICE PROVIDER MESSAGE 2
THE FOLLOWING CUSTOMER HAS A FAILED ( ) IRD, ACCESS CARD, MODEM, ODU..
DATE REPORTED: JANUARY 02, 2004
CUSTOMER ID: 1234556
PROBLEM: FAIL TEST 4, LNB 13V, OVER CURRENT

FIG.8a

DEALER MESSAGE 2
THE FOLLOWING CUSTOMER HAS NEED FOR HARDWARE REPLACEMENT
DATE REPORTED: JANUARY 02, 2004
CUSTOMER ID: 1234556
CUSTOMER NAME: BRIAN JONES
CUSTOMER PHONE NUMBER: (310) 555-1212
PROBLEM: FAIL TEST 4, LNB 13V, OVER CURRENT
IRD: HNS HYH-SA
IRD ID: 0006A3DR422
RESPONSIBLE DEALER: SATELLITE SERVICES INC., EL SEGUNDO CA., (310) 515-5555

SYSTEM AND METHOD FOR PERFORMING DIAGNOSTICS FOR A CUSTOMER IRD IN A SATELLITE TELEVISION SYSTEM

BACKGROUND OF THE INVENTION

1. Field of the Invention

This invention relates to satellite broadcast television and more specifically to test procedures for performing failure diagnostics on a customer IRD.

2. Description of the Related Art

Satellite television programming has become widely available and has become a popular alternative to analog broadcast and cable services. Service providers such as DIRECTV® and EchoStar Communications Corp. (Dish Network™) provide a wide variety of programming.

Figure 1:
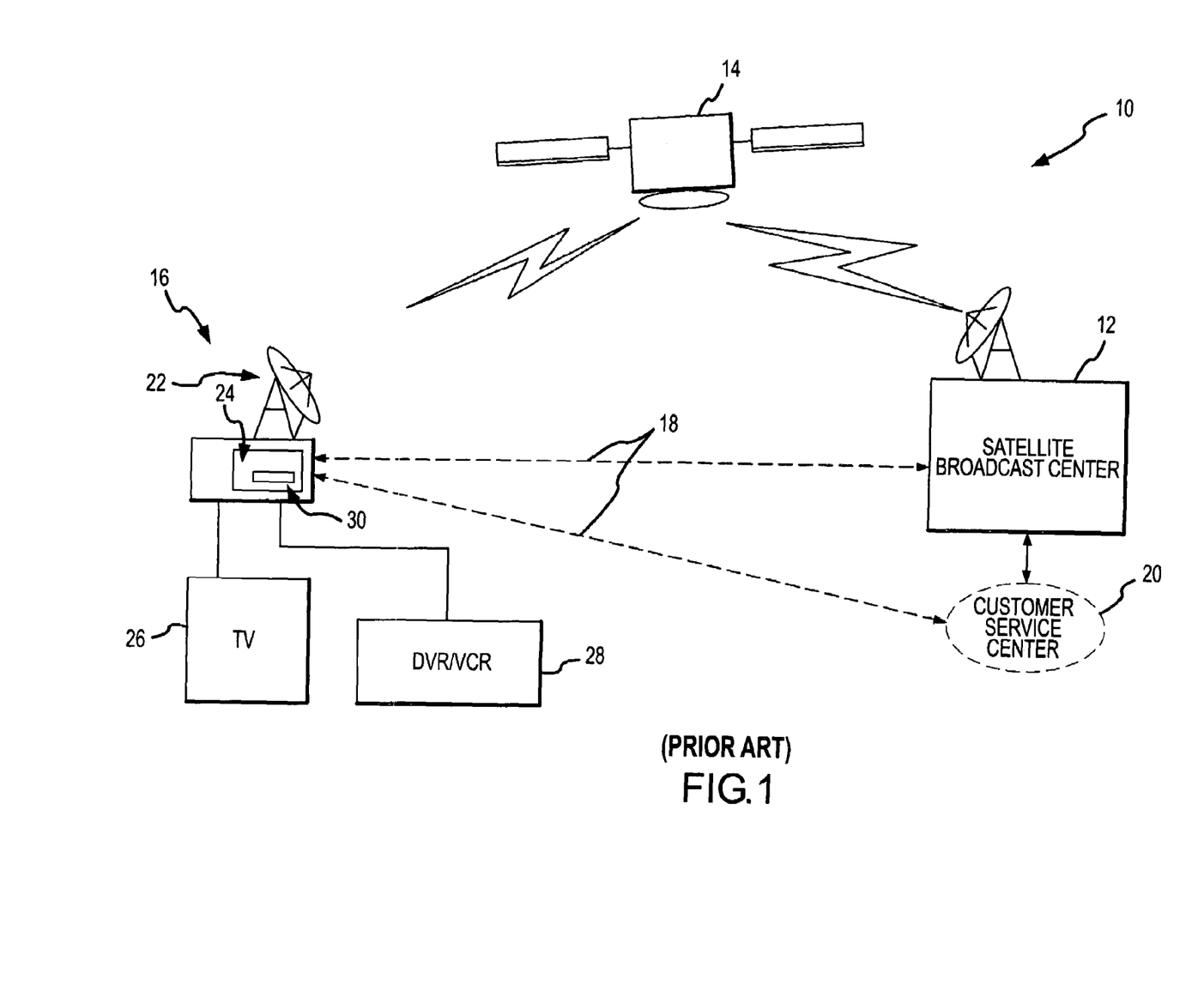
FIG. 1, as described above, is a block diagram of a satellite broadcast television system.

As shown in FIG. 1, a satellite television broadcast system 10 includes a satellite broadcast center (SBC) 12 that manages customer services and billing and stores and uplinks programming content and authorization data, one or more satellites 14 that broadcast the uplinked programming on a number of transponders, a plurality of customer sites 16 that download and play selected programming and a back channel 18 such as the public switched telephone network for communicating billing information from the customer site to the SBC 12 through a "callback" function and for communicating with customer service representatives (CSRs) at a customer service center 20.

Each customer site 16 includes an integrated receiver decoder (IRD) 22 for decrypting and decoding customer selected programming content; an antenna, a multiswitch for selection of the appropriate satellite signal, a coax cable from the antenna to the IRD, connectors, inline amplifiers and low noise block downconverter (LNBs) (collectively the outdoor unit "ODU" 24) for downloading and routing the broadcast stream to the IRD; a video display, e.g. TV, 26; and a recording device 28 such as a VCR. A digital video recorder (DVR) integrates the features of the IRD and recording device as well as many other features and services such as Tivo®. Each IRD includes universal components such as an RF tuner/demodulator for receiving a signal from the antenna, a phone modem for performing the "callback" function and a decoder for decrypting/decoding the programming content. Each IRD is paired with a removable access card 30 that is customer specific and includes security information such as decryption keys and account information such as account numbers, an access card ID number, subscribed services, rating limits and billing limits. The access card determines if the customer is authorized to watch a program, and if they are, sends an authorization to decode the audio and video packets in the broadcast stream and direct them to television 26 for viewing and/or recording device 28.

It is not uncommon that problems will occur at the customer site, which interferes with the customer's ability to select, download, decrypt or report back activity to the service provider. The source of failure can be improper installation, user error or hardware failures in the ODU, IRD or access card. The customer will typically call a CSR for assistance. At a minimum, the CSR should be able to identify the problem and take the proper remedial action such as mailing the customer a new access card, an IRD, or dispatching a technician to replace one of the ODU components. More often than not, the problem is not attributable to a hardware failure and easily fixed if it can be identified.

Unfortunately the current self-test functions of IRD, hence the information available to the CSR is very limited, at best performing a gross functional test. In most cases, the signal and tuning test only check for signal on the currently tuned transponder, the modem test verifies a dial tone, and a basic access card read test verifies communication with the access card and validates its ID number. A simple LNB polarity test is usually performed by having the customer tune to channels 100 (ODD), 999 (EVEN) and 400 (119 switching), but this only confirms a problem exists; it does not isolate the problem. Even these basic tests require the CSR to walk the customer through the on-screen menu to verify the signal levels and validate communication with the access card, which is time consuming and frustrating for the customer.

Accurately troubleshooting these problems, especially remotely, is very difficult, and not always very precise. CSRs typically work from a script and are not experienced. Different CSRs may diagnose the same failure differently, prompting the customer to make repeated calls looking for resolution to their problem. Ultimately it is the CSR's judgment call as to the problem; do they replace the IRD, the access card or dispatch a technician? Typically they will replace either the access card or the IRD, a vast majority of which have no failures when returned for repair.

The limited self-test capabilities of the IRD and the ad hoc diagnostic procedures performed by the CSRs cost the service provider time and money and reduce customer satisfaction; in some cases leading to the customer's dropping the service.

SUMMARY OF THE INVENTION

The present invention provides an IRD with expanded self-test capabilities, both hardware and software, that will provide standardized and more precise diagnostics with limited customer interaction and more reliable and accountable service. This in turn will save the service provider time and money and will limit downtime thereby enhancing customer satisfaction.

This is accomplished by defining a set of tests for the IRD and ODU, upgrading the IRD hardware and storing the software for executing the tests in the IRD. When a service problem occurs, an IRD test is initiated by either calling a CSR or automated test center, which in turn send a packet over the broadcast network to the customer's IRD, or by relying on the customer to navigate an on-screen menu.

The IRD runs a sequence of tests that determine the fitness of the IRD including the access card and modem and the health of the ODU. Instructions are displayed on-screen if customer interaction is required, e.g. "remove/replace the coax between the IRD and ODU." As the tests are completed, the results are displayed on-screen and written to a file. If a test fails, the appropriate remedial action such as "reset to factory default settings", "service call", "replace IRD, access card, modem, ODU" or "do nothing" is also written to the file.

When the test sequence is complete, the IRD creates a header message identifying the customer, the date, the problem and the remedial action, appends the file and forwards it to the satellite service provider over a back channel (fax, email, data packet). The satellite service provider archives the file, modifies the header message to provide customer contact information and the responsible dealer, and forwards the file to the service dealer. The service dealer performs the specified remedial action by either making a service call or mailing the replacement hardware.

To improve service and accountability, the network may be configured so that when the dealer receives and accepts the service request from the satellite service provider, an acknowledgement is sent from the dealer back to the service provider confirming that the remedial action will be taken.

The service provider in turn sends an acknowledgement over the broadcast network to the customer specifying the service dealer, the remedial action and schedule. This provides the service provider with a "paper trail" that the dealer has in fact received and accepted the service request and provides the customer with assurances that the problem will be fixed in a timely manner and a phone number to call if service is not forthcoming. The acknowledgement and actual service performed may be appended to the file and archived at the service provider.

These and other features and advantages of the invention will be apparent to those skilled in the art from the following detailed description of preferred embodiments, taken together with the accompanying drawings, in which:

DETAILED DESCRIPTION OF THE INVENTION

The present invention provides an IRD with expanded self-test capabilities, both hardware and software, that will provide standardized and more precise diagnostics with limited customer interaction and more reliable and accountable service. This in turn will save the service provider time and money and will limit downtime thereby enhancing customer satisfaction.

Figure 2A:
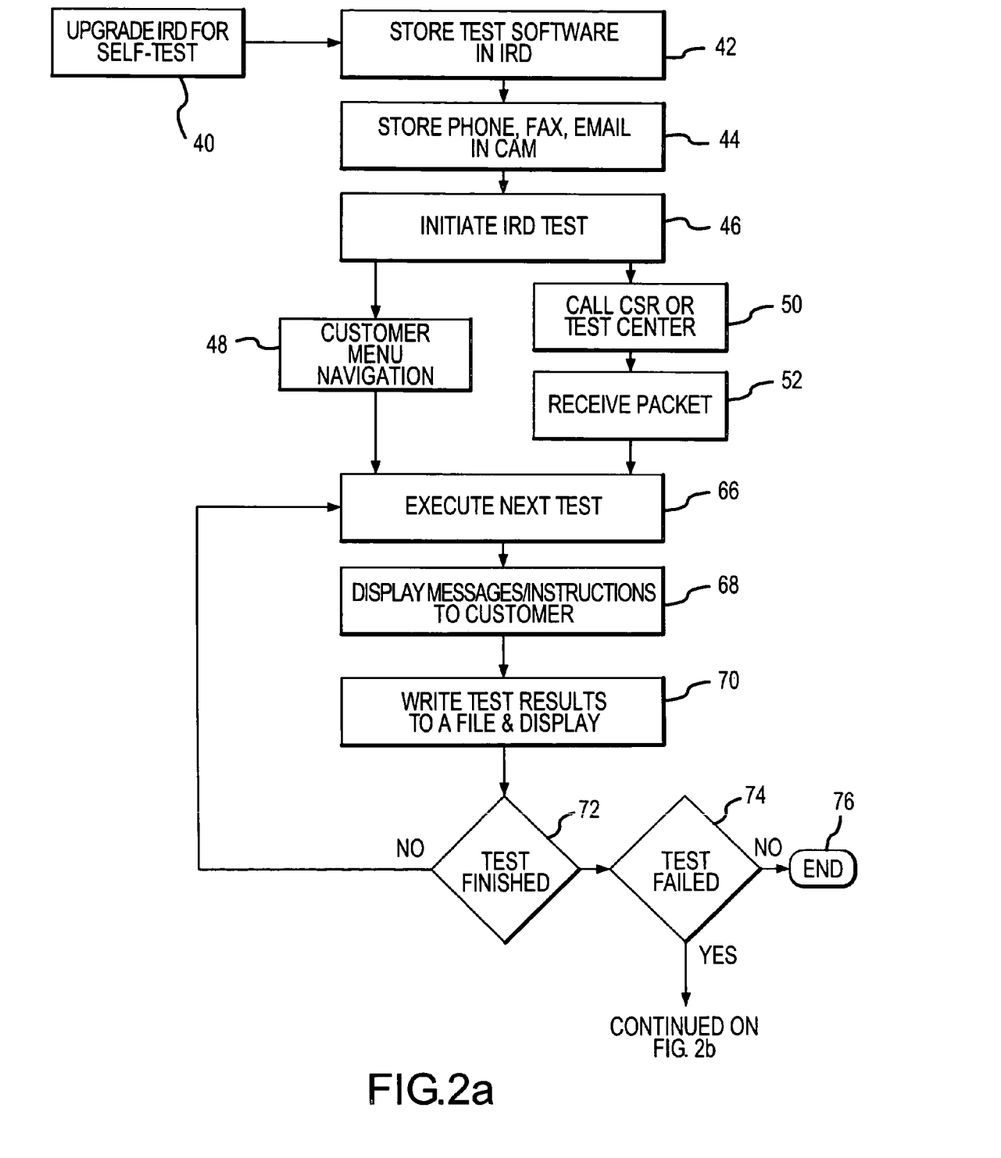
FIGS. 2a and 2b are a flowchart of the IRD self-test diagnostics in accordance with the present invention.
Figure 2B:
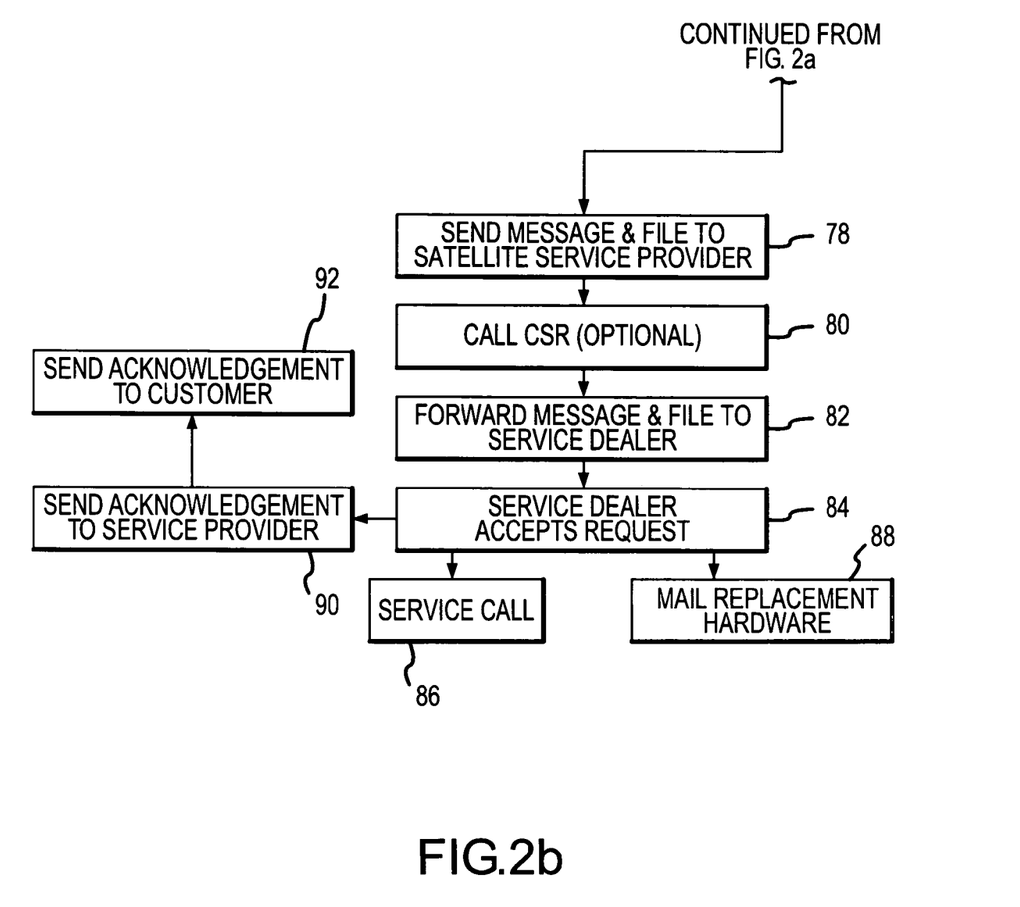

As illustrated in FIGS. 2a and 2b, this is accomplished by defining a set of tests for the IRD and ODU, upgrading the IRD hardware (step 40) and storing the software for executing the tests in the IRD (step 42). A phone or fax number or email address is also stored in the access card for communicating test information to the service provider (step 44). When a service problem occurs, an IRD test is initiated (step 46). The customer may initiate the IRD test by navigating and on-screen menu (step 48). Alternately the customer may call a CSR or automated test center (step 50), which in turn initiate IRD test by sending a packet over the broadcast network to the customer's IRD (step 52). Or the CSR may walk the customer through the on-screen menu.

Figure 3:
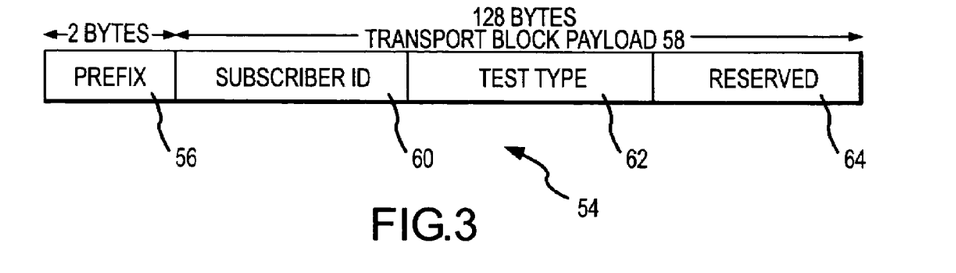
FIG. 3 is a diagram of a test packet.

As shown in FIG. 3, a DIRECTV transport packet 54 consists of 130 bytes. A DVB transport packet consists of 188 bytes. Using the DIRECTV packet for example, the first group of bytes is reserved for Prefix bits 56, and the remaining Bytes are used for the actual Transport Block payload 58. The Prefix contains several link layer control flags as well as the channel identities for many different video, audio, and data services. The Transport Block contains a Subscriber ID block 60 that is the actual unique ID number identifying the customer's IRD, a Test Type block 62 that specifies which tests to run, e.g. Full Self Test, IRD Test Only or ODU Test Only, and a Reserved block 64 for future use.

Once initiated, the IRD runs a sequence of tests that determine the fitness of the IRD including the access card and modem and the health of the ODU (step 66). Instructions or messages are displayed on-screen if customer interaction is required, e.g. "remove/replace the coax between the IRD and ODU" (step 68). As the tests are completed, the results are displayed on-screen and written to a file (step 70). If a test fails, the appropriate remedial action such as "reset to factory default settings", "service call", "replace IRD, access card, modem, ODU" or "do nothing" is also written to the file. The IRD executes each successive test until finished (step 72). If no test fails (step 74), a "test passed" message may be displayed to the customer and the test ends (step 76).

If one or more tests fail, the IRD creates a header message identifying the customer, the date, the problem and the remedial action, appends the file and forwards it to the satellite service provider over a back channel (fax, email, data packet) (step 78). The system may be configured to send this message even if all tests pass. The customer may at this point call the CSR to discuss the test results and what will happen next (step 80). The satellite service provider archives the file, modifies the header message to provide customer contact information and the responsible dealer, and forwards the file to the service dealer (step 82). The service dealer accepts the service request (step 84) and performs the specified remedial action by either making a service call (step 86) or mailing the replacement hardware (step 88).

To improve service and accountability, the network may be configured so that when the dealer receives and accepts the service request from the satellite service provider, an acknowledgement is sent from the dealer back to the service provider confirming that the remedial action will be taken (step 90). The service provider in turn sends an acknowledgement over the broadcast network, telco, internet or some other communication channel to the customer specifying the service dealer, the remedial action and schedule (step 92). This provides the service provider with a "paper trail" that the dealer has in fact received and accepted the service request and provides the customer with assurances that the problem will be fixed in a timely manner and a phone number to call if service is not forthcoming. The acknowledgement and actual service performed may be appended to the file and archived at the service provider.

A particular sequence of IRD and ODU tests 94 is illustrated in FIGS. 4a through 4e. The results of each test including Pass/Fail and the performance are written to a test data report as the tests are completed. Exemplary on-screen display messages 96, an IRD diagnosis test data report 98, service provider and dealer messages for a service call (TEXT1) 100 and 102 and service provider and dealer messages for replacing hardware (TEXT2) 104 and 106 are illustrated in FIGS. 5, 6, 7 and 8, respectively. The requisite hardware and software modifications to a standard IRD 108 are discussed with reference to FIG. 9. Modifications to each test or message, additional tests or a different order for execution are within the diagnostic test procedures contemplated.

Upon initiation of the test sequence (step 110), the IRD measures the even polarity LNB voltage supplied by the IRD to the ODU to ensure compliance with specifications (step 112). If the voltage is too high, the LNB and/or multiswitch may burn up. If the voltage is too low, the LNB and/or multiswitch will not switch properly. If the LNB voltage is not within the specification (step 114), the customer is instructed to "Remove the Coax Cable from the Satellite Antenna In Connector" via OSD1 116 and the test is rerun (step 118). Removal of the Coax Cable removes a possible short circuit and isolates the IRD from the ODU to better isolate the failed component. If the test fails again, the required remedial action is to replace the IRD (step 120). The customer is informed that "A Failure has been detected in the IRD" via OSD3 122 and a TEXT2 service provider message 104 is generated indicating that the customer has a failed IRD. If the test passes twice with the coax disconnected, the required remedial action is a service call (step 124). The customer is informed that "An Error has been detected in the IRD" via OSD2 126 and a TEXT1 service provider message 100 is generated indicating that the customer requires service. The test sequence may either continue to execute all of the tests to provide a complete test report or may terminate on detection of a failure.

Figure 4A:
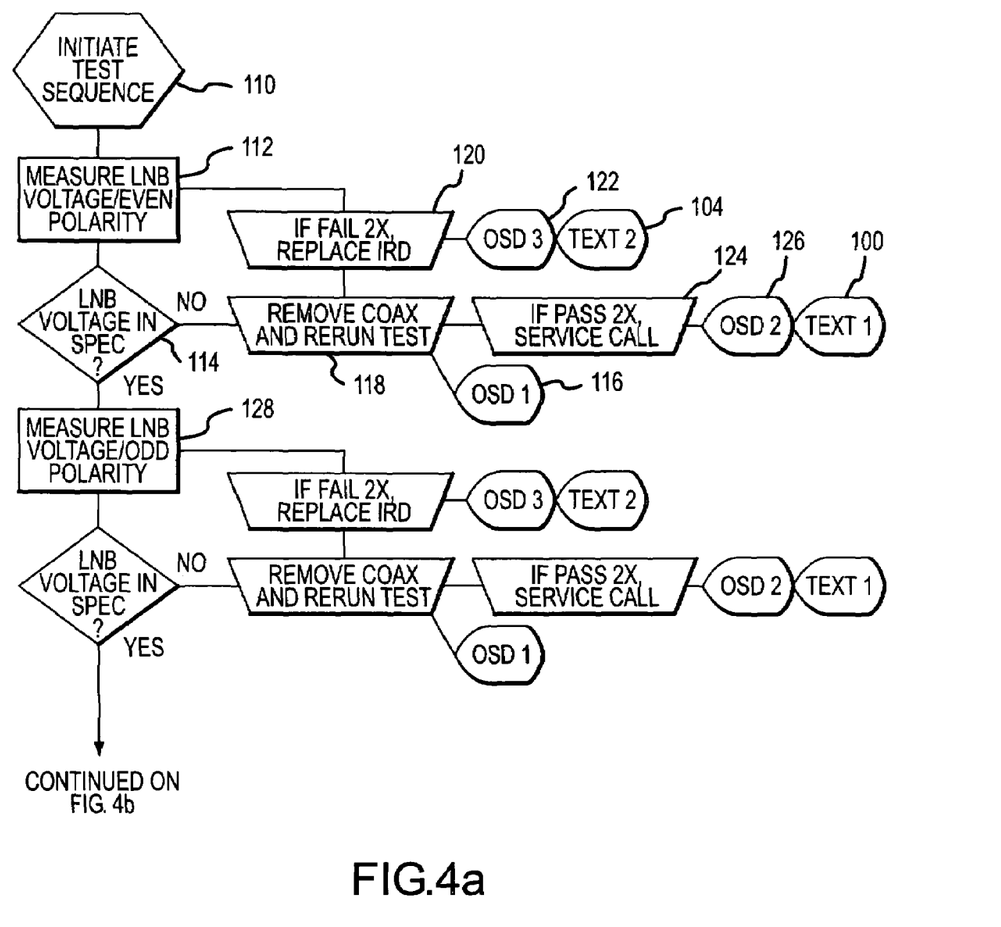
FIGS. 4a-4e are flowcharts illustrating the execution of the test packet.

Assuming either that the first test passes or that all tests in the sequence are run, the odd polarity LNB voltage is measured (step 128) and interrogated using the same sequence of steps and messages.

Figure 4B:
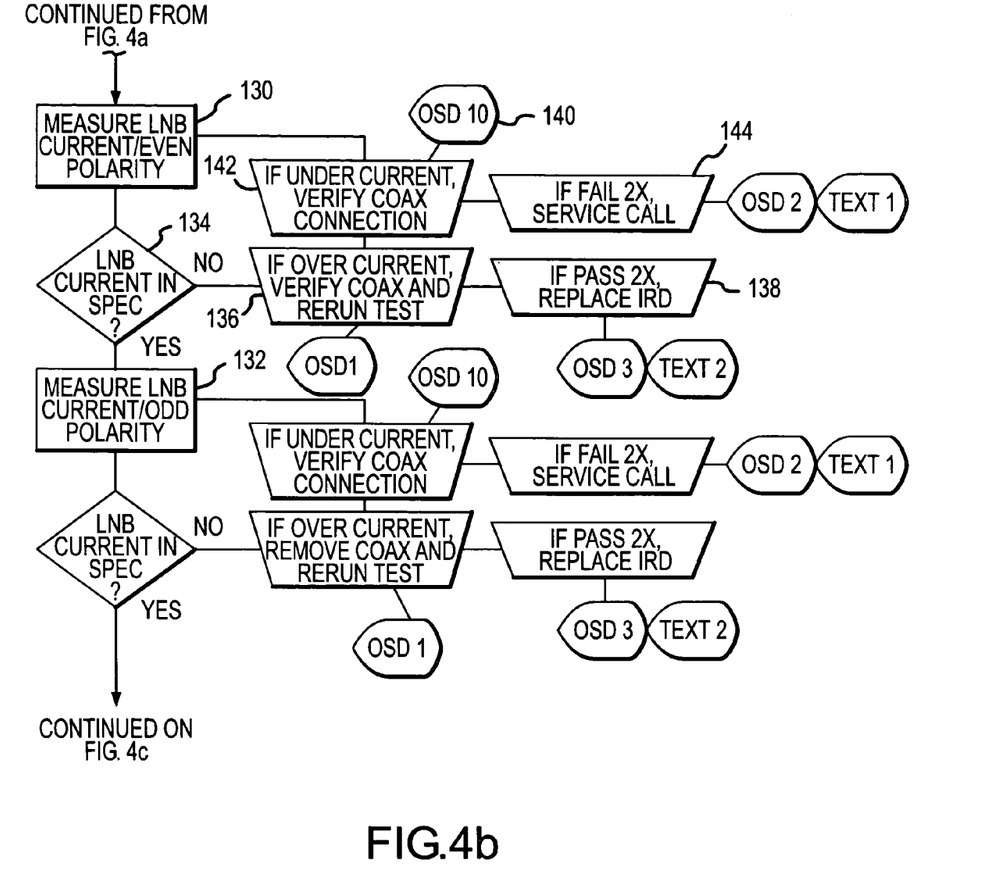
Figure 5:
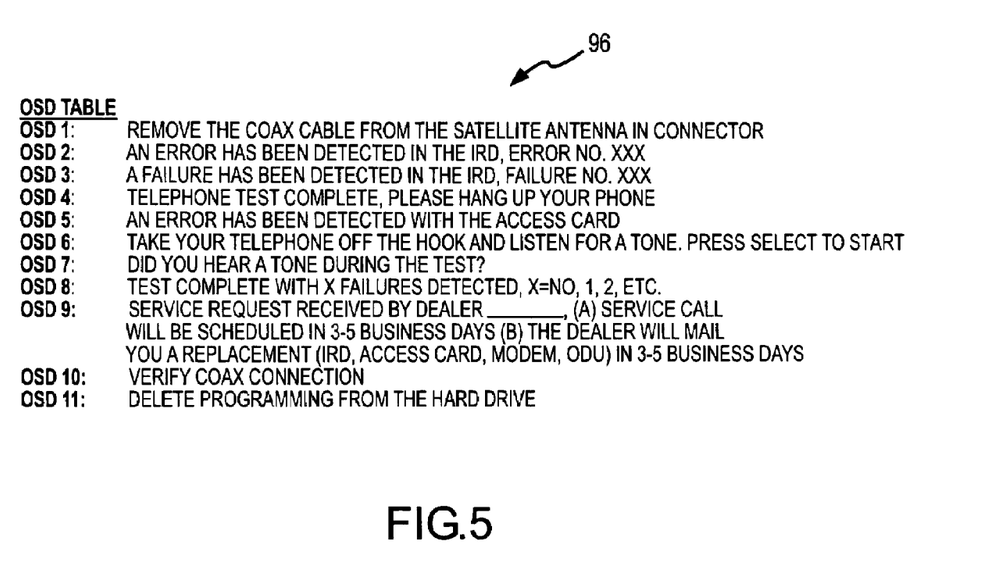
FIG. 5 is a table of OSD messages provided to the customer during execution.
Figure 6:
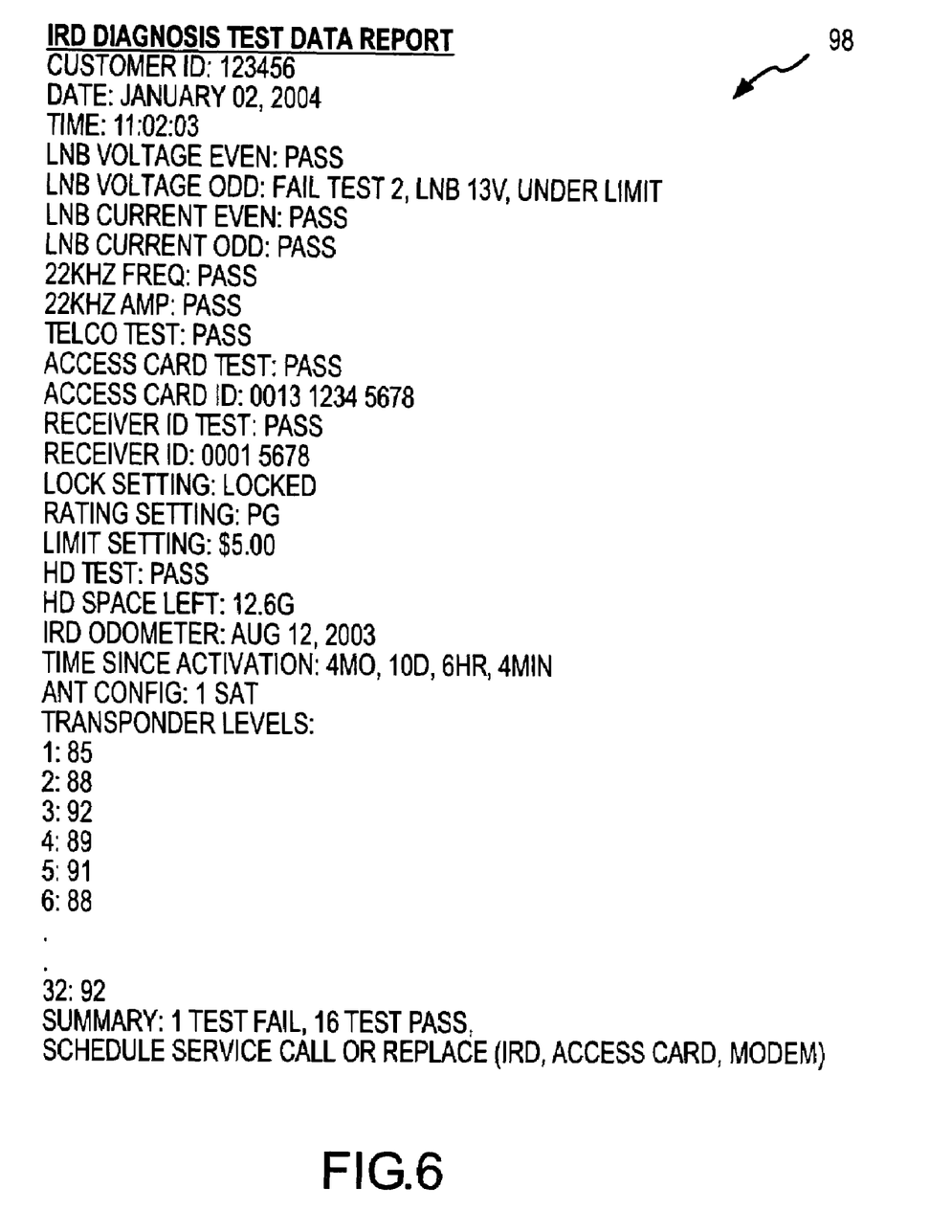
FIG. 6 is diagram of a test report.
Figure 7A:
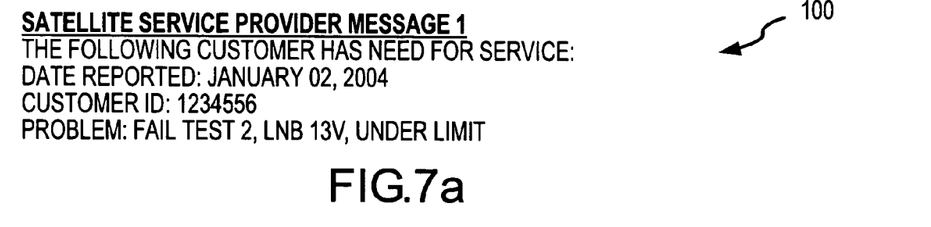
FIGS. 7a-7b and 8a-8b are examples of messages sent to the satellite service provider and the dealer.
Figure 7B:
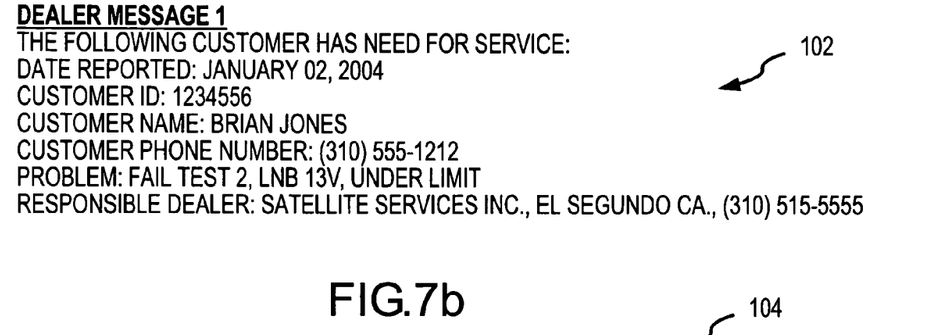
Figure 8A:
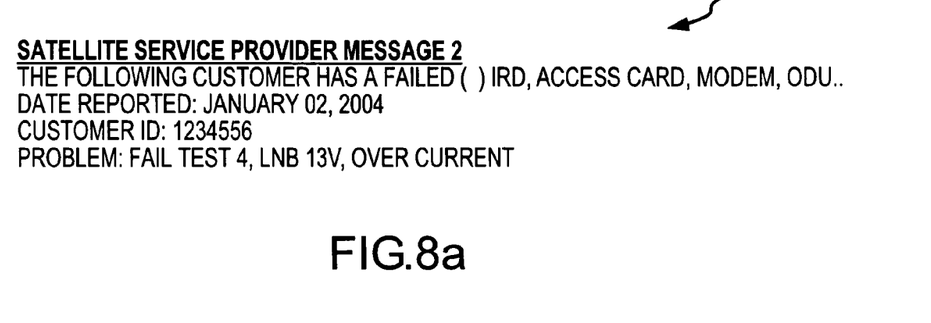
Figure 8B:
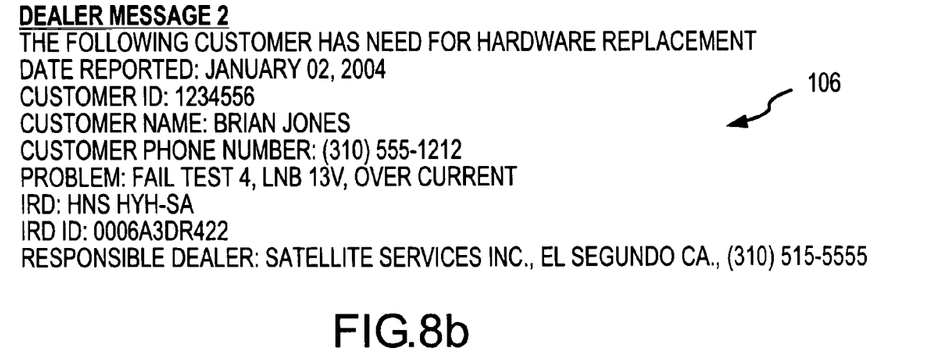

A similar sequence of steps are used to measure the even and odd polarity LNB currents (steps 130, 132) and then interrogate any problems. If the LNB current is not within the specification (step 134), it is either "over current" or "under current". If over current, the customer is instructed to "Remove the Coax Cable from the Satellite Antenna In Connector" via OSD1 116 and the test is rerun (step 136). If the test fails again, the required remedial action is to replace the IRD (step 138). The customer is informed that "A Failure has been detected in the IRD" via OSD3 122 and a TEXT2 service provider message 104 is generated. If under current, the customer is instructed to "Verify Coax Connection" via OSD10 140 and the test is rerun (step 142). If the test fails again, the required remedial action is a service call (step 144). The customer is informed that "An Error has been detected in the IRD" via OSD2 126 and a TEXT1 service provider message 100 is generated. The results of the test including Pass/Fail and the performance are written to the test data report.

Thereafter, the IRD measures the 22 kHz tone frequency and amplitude coming out of the IRD (step 150). This test determines compliance with the specifications. If the frequency or amplitude are outside specifications then the IRD will not be able to switch to the other satellites. If the measurements are not within the specification (step 152), the customer is instructed to "Remove the Coax Cable from the Satellite Antenna In Connector" via OSD1 116 and the test is rerun (step 154). Removal of the Coax Cable isolates the IRD from the ODU. If the ODU is short circuited, the IRD which had failed, might now pass. If the test fails again, the required remedial action is to replace the IRD (step 156). The customer is informed that "A Failure has been detected in the IRD" via OSD3 122 and a TEXT2 service provider message 104 is generated.

Figure 4C:
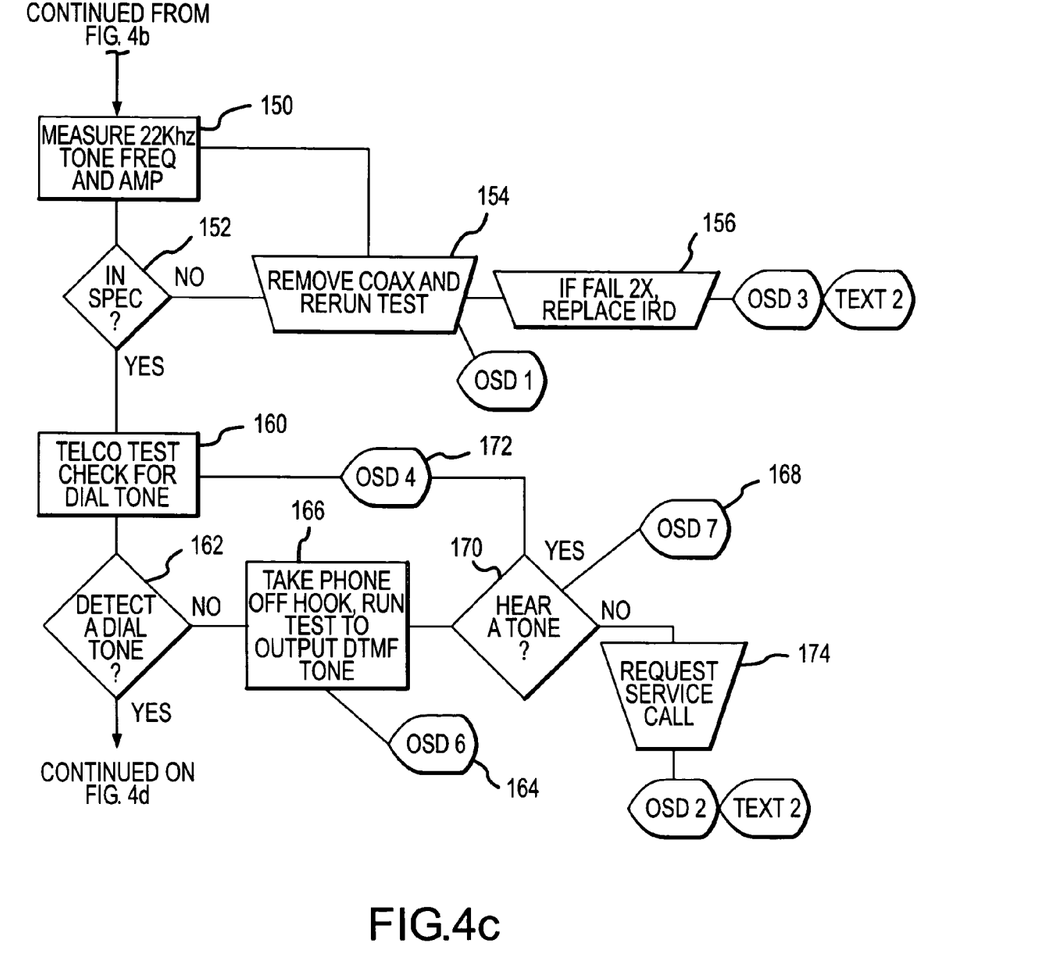

The IRD then executes the telco test to check for dial tone (step 160). If the IRD does not detect a dial tone (step 162), the customer is instructed to "Take your telephone off the hook and listen for a tone. Press select to start" via OSD 6 164 to initiate a sequence of DTMF tones (step 166). This outputs an audible tone that can be heard on the telephone while it is even off hook. If the customer and CSR are on the phone, the IRD would never be able to detect a dial tone, so what this does is test the modem by outputting the tone for all to hear, thus validating the modem and connection to the phone line. The customer is queried "Did you hear a tone during the test?" via OSD7 168 (step 170). If the customer responds in the affirmative by clicking a menu button on the OSD, the message "Telephone test complete, please hang up your phone" is displayed via OSD4 172 and the test ends. If the customer responds in the negative, the required remedial action is to schedule a service call (step 174). The customer is informed that "A Failure has been detected in the IRD" via OSD3 122 and a TEXT2 service provider message 104 is generated indicating that the customer has a failed IRD.

The IRD attempts to test the access card, including reading the access card ID number (step 180). This validates that the card reader in the IRD is functional and the access card itself is functional and can perform a simple read write operation. If unsuccessful, the required remedial action is to replace the access card (step 182). The customer is informed that "A error has been detected with the access card" via OSD5 184 and a TEXT2 service provider message 104 is generated indicating that the customer has a failed access card.

Figure 4D:
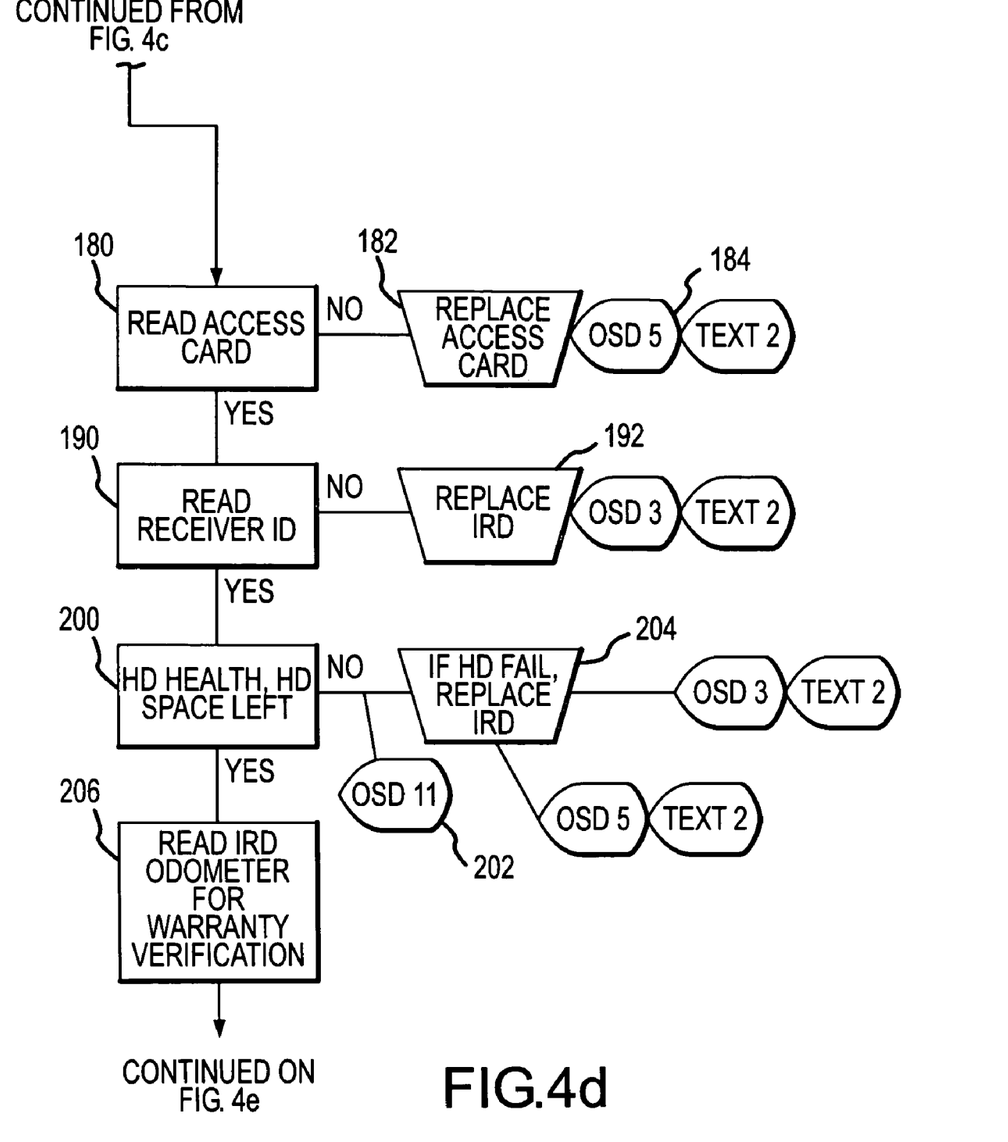

The IRD then attempts to read the IRD ID (step 190). If unsuccessful, the required remedial action is to replace the IRD (step 192). The customer is informed that "A failure has been detected in the IRD" via OSD3 122 and a TEXT2 service provider message 104 is generated indicating that the customer has a failed IRD.

The IRD then tests the hard drive for both space remaining and the health of the drive (step 200). If the drive is nearly full, the customer is instructed to "Delete programming from the hard drive" via OSD 202. If the hard drive is unhealthy, the required remedial action is to replace the IRD (step 204). The customer is informed that "A failure has been detected in the IRD" via OSD3 122 and a TEXT2 service provider message 104 is generated indicating that the customer has a failed IRD. The IRD then reads and records the IRD odometer reading (date and/or time the IRD was first activated) for warranty verification (step 206).

Figure 4E:
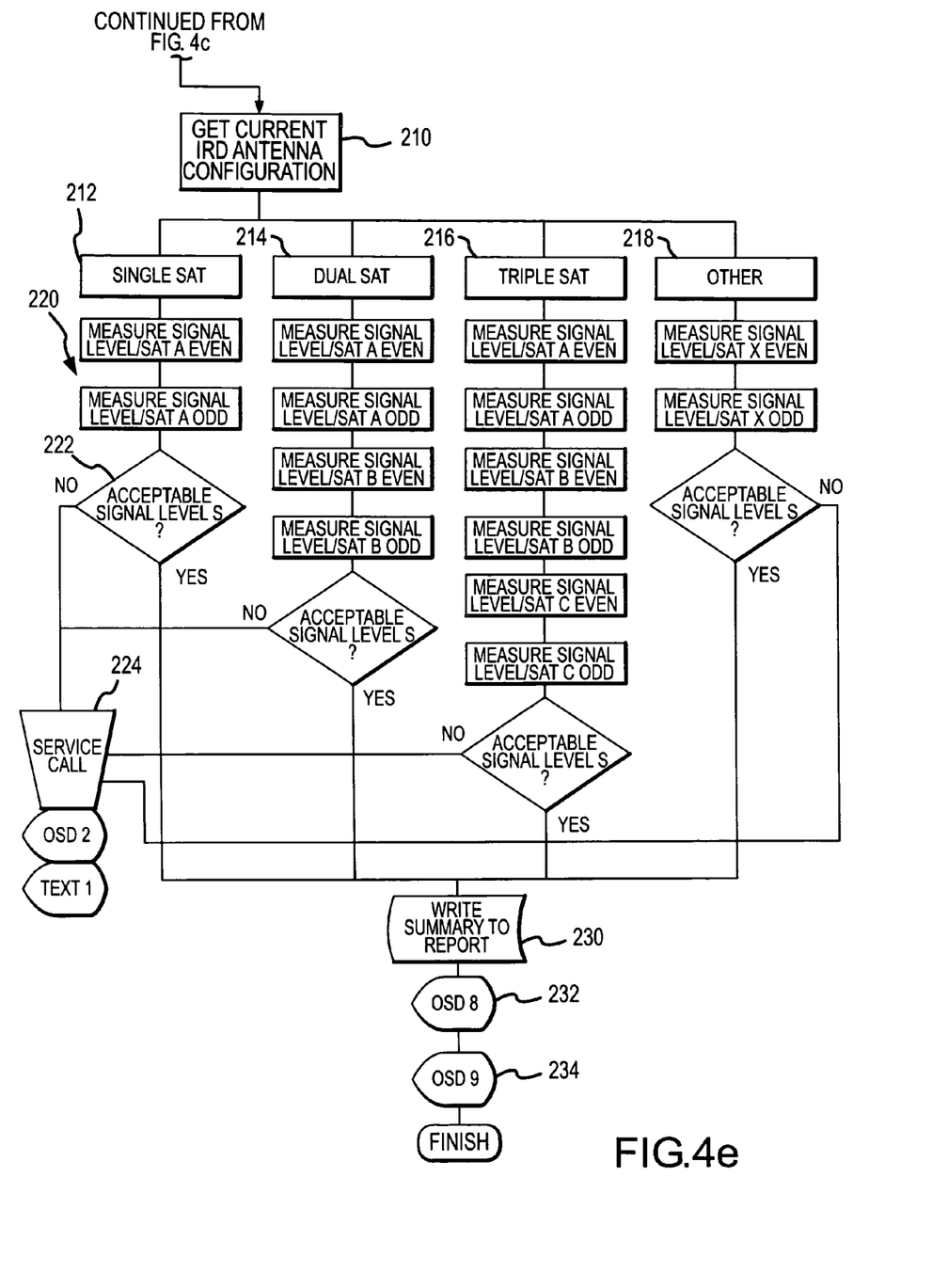

The IRD then retrieves the current IRD antenna configuration (step 210) (Single 212, Dual 214, Triple 216 or Other 218 Satellite) to perform the signal level test, both even and odd polarities on all applicable satellites to verify that either the LNB or multi-switch properly switches polarity. The IRD then measures and records the even and odd polarity signal levels for the satellites A, B, C, . . . (step 220). If any signal level is unacceptable (step 222), the required remedial action is a service call (step 224). The customer is informed that "An Error has been detected in the IRD" via OSD2 126 and a TEXT1 service provider message 100 is generated indicating that a service call is needed.

Once the sequence of tests is completed, the IRD writes a summary to the test data report 98 (step 230). For example, 1 TEST FAIL, 16 TEST PASS, Schedule Service Call or Replace (IRD, Access Card, Modem). The customer is informed of the test results "Test complete with X Failures Detected" via OSD 8 232 and of the remedial action that will be taken "Report forwarded to satellite service provider, Service call will be scheduled in 3-5 business days" or "Report forwarded to satellite service provider, the dealer will mail you a replacement (IRD, access card, modem) in 3-5 business days" via OSD 11 234. At this point, steps 78-92 are executed to forward the header messages 100 and/or 104 and test data report 98 to the satellite service provider, which archives the reports and generates the TEXT1 or TEXT2 dealer messages 102 or 106. When the dealer receives and acknowledges the service request or hardware replacement, an acknowledge message is sent back to the satellite service provider and customer confirming the remedial action.

Figure 9:
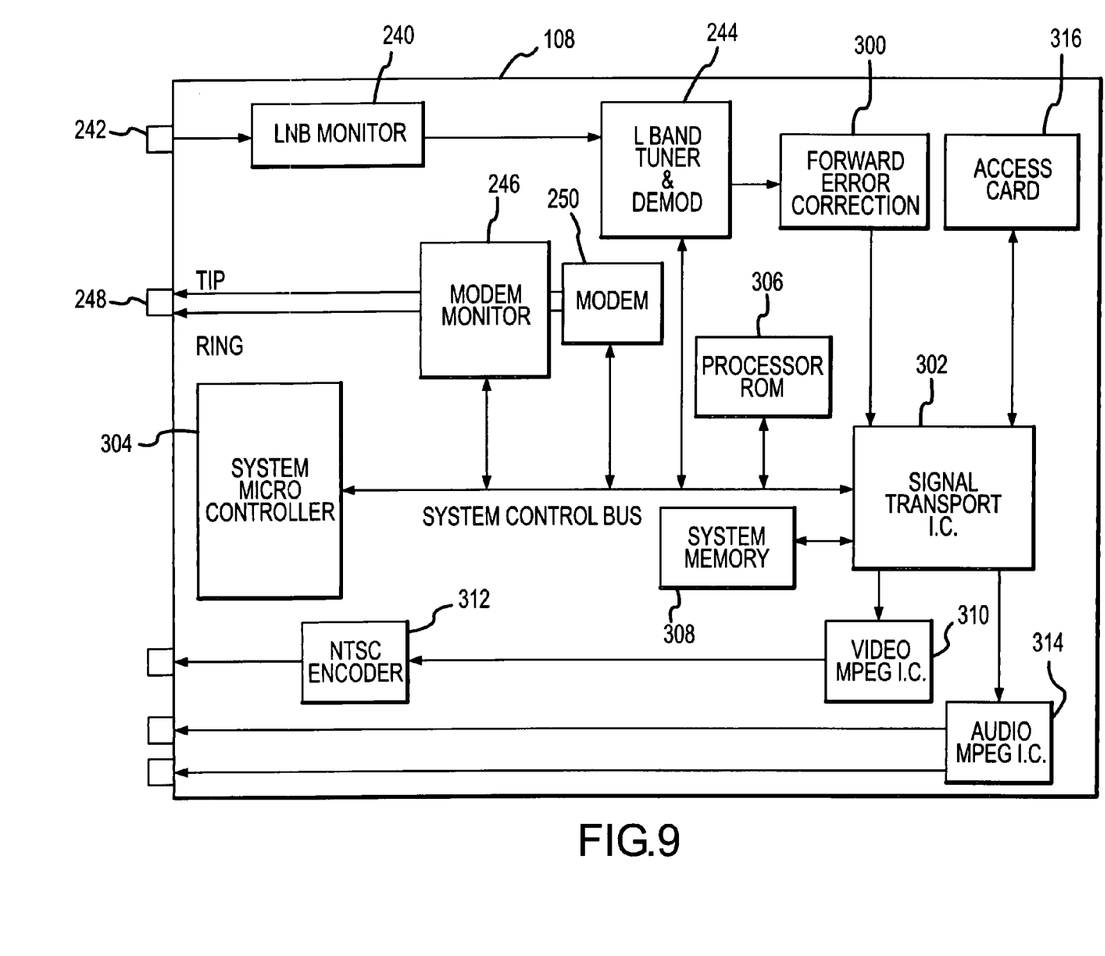
FIG. 9 is a diagram of a modified IRD.

To perform the sequence of self-tests the standard IRD 108 must be upgraded as shown in FIG. 9. The standard IRD includes forward error correction 300, a signal transport IC 302, system micro controller 304, processor ROM 306, system memory 308, a video MPEG IC 310, an NTSC encoder 312, an audio MPEG IC 314 and an access card 316 whose functionality is well known.

The hardware is modified to include a LNB monitor 240 between the satellite signal input 242 and the L band tuner and demodulator 244 to measure the LNB voltage and current and perform the 22 Khz tone test. The LNB monitor 240 measures the voltage and current provided by the tuner/demodulator at input 242 when terminated with a coax to the antenna. The LNB monitor also generates a 22 Khz tone for testing the 110/119 switching function of the multiswitch in the ODU. These types of simple measurement and test circuits are well known in the art.

The hardware may also be modified to include a modem monitor 246 between a telephone jack 248 and the modem 250. to internalize the telco tests. The modem monitor would not only test for the dial tone but would also test the phone line for acceptable operation parameters or conditions, e.g. voltage and current. The modem monitor could also supply DTMF tones that could be heard by the customer and CSR while on the phone to verify that the modem itself is operational.

The other test functions can be implemented with software changes and downloads to the access card. The operation of the standard IRD is well known in the art and will not be discussed herein.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of performing diagnostics at a customer site in a satellite TV broadcast system, comprising:

storing a number of tests related to an integrated receiver decoder (IRD) and an outdoor unit (ODU) on the IRD;

in response to a self test request, said IRD executing a sequence of the tests to determine performance characteristics of the IRD and ODU and a remedial action, wherein said sequence of the tests comprises a plurality of the following stored tests:

an even and odd polarity LNB voltage test comprising said IRD measuring the even and odd polarity LNB voltage supplied by the IRD to the ODU, if said LNB voltage is not in compliance with a specification said IRD generating an on-screen display (OSD) message and a service provider message;

an even and odd polarity LNB current test comprising said IRD measuring the even and odd polarity LNB current supplied by the IRD to the ODU, if said LNB current is not in compliance with a specification said IRD generating an OSD message and a service provider message;

a tone test comprising said IRD measuring the tone frequency and amplitude supply by the IRD, if said frequency or amplitude are not in compliance with a specification said IRD generating an OSD message and a service provider message;

a telephone test comprising said IRD checking for a dial tone on a phone line connected to the IRD, if no dial tone is detected said IRD generating an OSD message and a service provider message;

said access card test comprising said IRD reading the access card IRD number, if unsuccessful said IRD generating an OSD message and a service provider message;

a receiver ID test comprising said IRD reading the IRD ID, if unsuccessful said IRD generating an OSD message and a service provider message;

a hard drive test comprising said IRD test for both space and health of the drive, if hard drive is full or unhealthy said IRD generating an OSD message and a service provider message;

an odometer test comprising said IRD reading the date the IRD was first activated; and a signal level test comprising said IRD retrieving the current IRD antenna configuration and measuring the even and odd polarity signals for each satellite, if any signal level is unacceptable said IRD generating an OSD message and a service provider message;

said IRD recording the performance characteristics and remedial action in a test report;

said IRD communicating the test report back to a satellite service provider; and performing the remedial action.

2. The method of claim 1, wherein the self test request is initiated by customer menu navigation or receipt of a packet sent by a customer service representative (CSR) or test center.

3. The method of claim 1, wherein during the execution of the sequence of tests instructions and/or messages are displayed to the customer to facilitate the successful execution.

4. The method of claim 1, wherein the test report includes a customer ID, date and time of test, a list of each executed test, whether the test passed or failed, and the measured performance characteristics for any failed tests.

5. The method of claim 1, further comprising:

said service provider archiving the test report and if a service call or hardware replacement is required forwarding a request for service and the test report to a responsible service dealer;

said service dealer receiving the test report, sending an acknowledgement of acceptance in the form of a text based message including the remedial action to be performed and the schedule for performance to the satellite service provider; and said satellite service provider archiving the acknowledgement and forwarding the acknowledgement to the customer.

6. The method of claim 5, wherein the service dealer performs the remedial action by either calling the customer to schedule a service call or mailing the replacement hardware to the customer.

7. The method of claim 5, further comprising:

if one or more tests fail, said IRD generating a satellite service provider header message including a customer ID, a date reported, a test failed and a remedial action requested;

said IRD appending the test report to the header message;

said IRD forwarding them to the satellite service provider; and said service provider archiving the header message.

8. The method of claim 7, further comprising at the satellite service provider:

reconfiguring the header message to further include a customer name and phone number and a responsible service dealer;

archiving the reconfigured header message; and forwarding the reconfigured header message and test report to the responsible service dealer.

9. The method of claim 1, further comprising:

said service provider sending a request in the form of a text based message to a responsible service dealer to perform the remedial action;

said service provider receiving an acknowledgement of acceptance in the form of a text based message from the service dealer; and said service provider forwarding the acknowledgement to the customer.

10. The method of claim 1, wherein the IRD either executes a sequence of all the tests or executes a sequence of tests until a failure occurs.

11. The method of claim 1, wherein the remedial action is selected from reset to factory default settings, replace hardware, schedule service call and do nothing.

12. A method of performing diagnostics at a customer site in a satellite TV broadcast system, comprising:
   storing IRD tests including:
      an even and odd polarity LNB voltage test comprising said IRD measuring the even and odd polarity LNB voltage supplied by the IRD to the ODU, if said LNB voltage is not in compliance with a specification said IRD generating an on-screen display (OSD) message and a service provider message;
      an even and odd polarity LNB current test comprising said IRD measuring the even and odd polarity LNB current supplied by the IRD to the ODU, if said LNB current is not in compliance with a specification said IRD generating an OSD message and a service provider message;
      a tone test comprising said IRD measuring the tone frequency and amplitude supply by the IRD, if said frequency or amplitude are not in compliance with a specification said IRD generating an OSD message and a service provider message;
      a telephone test comprising said IRD checking for a dial tone on a phone line connected to the IRD, if no dial tone is detected said IRD generating an OSD message and a service provider message;
      said access card test comprising said IRD reading the access card IRD number, if unsuccessful said IRD generating an OSD message and a service provider message;
      a receiver ID test comprising said IRD reading the IRD ID, if unsuccessful said IRD generating an OSD message and a service provider message;
      a hard drive test comprising said IRD test for both space and health of the drive, if hard drive is full or unhealthy said IRD generating an OSD message and a service provider message;
      an odometer test comprising said IRD reading the date the IRD was first activated; and
      a signal level test comprising said IRD retrieving the current IRD antenna configuration and measuring the even and odd polarity signals for each satellite, if any signal level is unacceptable said IRD generating an OSD message and a service provider message;
   in response to either a packet received via the network or a customer generated request, said IRD executing a sequence of the tests to determine performance characteristics of the IRD and ODU and a remedial action selected from reset to factory default settings, replace hardware, schedule service call and do nothing;
   said IRD displaying a sequence of instructions and messages to the customer via a TV;
   said IRD recording the performance characteristics and remedial action in a test report;
   said IRD appending the test report to a satellite service provider header message;
   said IRD communicating the header message and test report back to the satellite service provider;
   said satellite service provider archiving the header message and test report;
   if a service call or hardware replacement is required, said satellite service provider forwarding a text based request for service and a reconfigured header message and test report to the customer's service dealer;
   the service dealer scheduling a service call or replacing the specified hardware;
   said service dealer sending a text based acknowledgment of acceptance to the satellite service provider; and
   said satellite service provider forwarding the acknowledgement to the customer.

13. The method of claim 12, wherein the test report includes a customer ID, date and time of test, a list of each executed test, whether the test passed or failed, and the measured performance characteristics for any failed tests.

14. The method of claim 12, wherein the header message includes a customer ID, a date reported, a test failed and the remedial action requested.

15. The method of claim 14, wherein the reconfigured header message further includes a customer name and phone number and the customer's service dealer.

16. A satellite TV network configured to perform self-diagnostics at customer sites, comprising:
   a satellite network for broadcasting programming and other data in a broadcast stream to a plurality of customer sites, each customer site comprising,
      an outdoor unit (ODU) including an antenna for downloading programming;
      an integrated receiver decoder (IRD) for decoding downloaded programming, said IRD including a memory for storing a number of tests related to the IRD and ODU;
      a television for displaying selected programming; and
      a backchannel from the customer site to a satellite service provider,
   wherein said IRD is configured to execute a sequence of the stored tests to determine performance characteristics of the IRD and ODU and a remedial action, record the performance characteristics and remedial action in a test report, and send the test report back to the satellite service provider via the backchannel;
   wherein the sequence of stored tests comprises a plurality of the following tests:
      an even and odd polarity LNB voltage test comprising said IRD measuring the even and odd polarity LNB voltage supplied by the IRD to the ODU, if said LNB voltage is not in compliance with a specification said IRD generating an on-screen display (OSD) message and a service provider message;
      an even and odd polarity LNB current test comprising said IRD measuring the even and odd polarity LNB current supplied by the IRD to the ODU, if said LNB current is not in compliance with a specification said IRD generating an OSD message and a service provider message;
      a tone test comprising said IRD measuring the tone frequency and amplitude supply by the IRD, if said frequency or amplitude are not in compliance with a specification said IRD generating an OSD message and a service provider message;
      a telephone test comprising said IRD checking for a dial tone on a phone line connected to the IRD, if no dial tone is detected said IRD generating an OSD message and a service provider message;
      an access card test comprising said IRD reading the access card IRD number, if unsuccessful said IRD generating an OSD message and a service provider message;
      a receiver ID test comprising said IRD reading the IRD ID, if unsuccessful said IRD generating an OSD message and a service provider message;

a hard drive test comprising said IRD test for both space and health of the drive, if hard drive is full or unhealthy said IRD generating an OSD message and a service provider message;

an odometer test comprising said IRD reading the date the IRD was first activated; and a signal level test comprising said IRD retrieving the current IRD antenna configuration and measuring the even and odd polarity signals for each satellite, if any signal level is unacceptable said IRD generating an OSD message and a service provider message.

17. The satellite TV network of claim 16, wherein the IRD initiates execution in response to customer menu navigation on the television or receipt of a packet sent by a customer service representative (CSR) or test center over the satellite network.

18. The satellite TV network of claim 16, wherein during the execution of the sequence of tests the television displays instructions and/or messages to facilitate the successful execution.

19. The satellite TV network of claim 16, wherein the IRD generates a header message, appends the test report to the header message, and forwards them to a satellite service provider, said satellite service provider archives the header message and test report, reconfigures the header message to include a customer name and phone number and a responsible service dealer and forwards a text based request for service and the reconfigured header message and test report to the responsible service dealer, said service dealer sends a text based acknowledgement of acceptance to the satellite service provider and said service provider archives the acknowledgements and forwards the acknowledgement to the customer.

20. The satellite TV network of claim 19, wherein the satellite service provider reconfigures the header message to include a customer name and phone number and a responsible service dealer and forwards the reconfigured header message and test report to the responsible service dealer.

21. The satellite TV network of claim 16, wherein the IRD comprises forward error correction, a signal transport IC, system micro controller, processor ROM, system memory, a video MPEG IC, an NTSC encoder, an audio MPEG IC and an access card, and further comprises:

an L band tuner and demodulator that provides voltage and current at a satellite signal input; and a LNB monitor between the satellite signal input and the L band tuner and demodulator to measure a LNB voltage and current when the input is terminated with a coax to the antenna and to generate a tone to perform a frequency tone test of the ODU.

22. The satellite TV network of claim 21, wherein the IRD further comprises a modem monitor between a telephone jack and the modem to internalize telco tests.

23. The satellite TV network of claim 16, wherein the IRD selects the remedial action from reset to factory default settings, replace hardware, schedule service call and do nothing.

24. The satellite TV network of claim 16, wherein said IRD is configured to execute a sequence of all of said tests or until at least one test fails.

* * * * *